United States Patent Office 3,803,121
Patented Apr. 9, 1974

3,803,121
COPPER COMPLEX REACTIVE MONOCHLORO-
S-TRIAZINE AZO DYESTUFF
Peter Gregory, Manchester, England, assignor to Imperial
Chemical Industries Limited, London, England
No Drawing. Filed Jan. 14, 1972, Ser. No. 217,951
Int. Cl. C09b 62/08; D06p 1/38, 3/66
U.S. Cl. 260—146 T          10 Claims

ABSTRACT OF THE DISCLOSURE

A disazo dyestuff of the formula

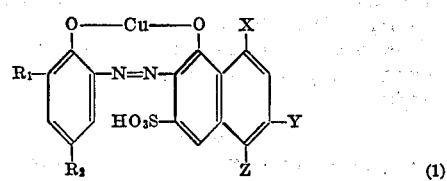

wherein $R_1$ is H, Cl, $NO_2$ or $SO_3H$ and $R_2$ is Cl, $NO_2$ or $SO_3H$, at least one of $R_1$ and $R_2$ being $SO_3H$, and either X is H, Z is $SO_3$ and Y is

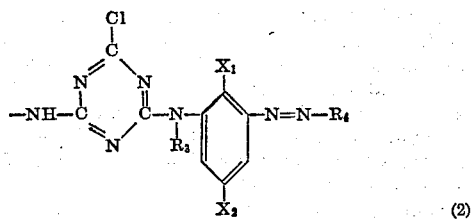

wherein $R_3$ is H or $CH_3$, $R_4$ is 4'-nitro-2,2'-disulphostilbene-4-yl or disulphonaphthyl, $X_1$ is H, $CH_3$ or $OCH_3$ and $X_2$ is H, $CH_3$, $OCH_3$, $NHCOCH_3$ or $NHCONH_2$, or X is Formula 2, one of Y and Z is H and the other is $SO_3H$. These dyes are brown reactive dyes of very good light fastness and can be used to dye cellulose textile materials.

This invention relates to new disazo dyestuffs useful as reactive dyes for the coloration of cellulose textile materials.

According to the invention there are provided disazo dyestuffs of the formula:

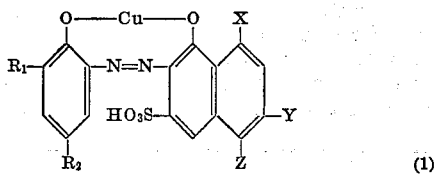

wherein $R_1$ is H, Cl, $NO_2$ or $SO_3H$ and $R_2$ is Cl, $NO_2$ or $SO_3H$, at least one of $R_1$ and $R_2$ being $SO_3H$, and either X is H, Z is $SO_3H$ and Y is a group of the formula:

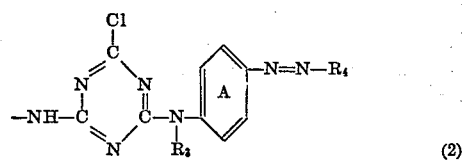

wherein $R_3$ is H or $CH_3$, $R_4$ is a 4'-nitro-2,2'-disulphostilbene-4-yl or a disulphonaphthyl radical, and the benzene nucleus A may be substituted by $CH_3$, $OCH_3$, $NHCOCH_3$ or $NHCONH_2$, or X is a group of Formula 2, one of Y and Z is H and the other is $SO_3H$.

The invention also provides a process for manufacture of the new dyestuffs which comprises reacting cyanuric chloride with one mole of a compound of the formula:

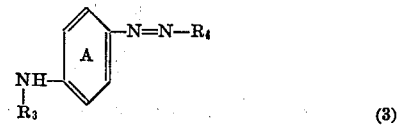

and with one mole of a compound of the formula:

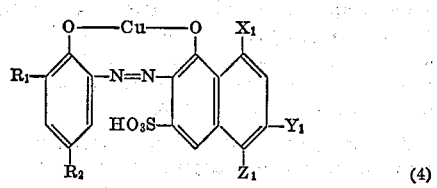

wherein $R_1$, $R_2$, $R_3$ and $R_4$ have the meanings stated above, the benzene nucleus A may be substituted as in Formula 2 and either $X_1$ is H, $Y_1$ is $NH_2$ and $Z_1$ is $SO_3H$, or $X_1$ is $NH_2$ and one of $Y_1$ and $Z_1$ is H and the other is $SO_3H$.

The above process may conveniently be carried out by stirring the cyanuric chloride with an aqueous solution of one of the compounds of Formulae 3 and 4 until replacement of one chlorine atom is substantially complete then adding the second compound and stirring until a second chlorine atom has reacted. The first stage is preferably carried out at a temperature between 0 and 10° C. and the second at between 30 and 50° C. It is preferable to add an acid-binding agent to neutralize the hydrogen chloride liberated during the reaction, and more especially to add this at such a rate as will maintain the pH of the reaction medium between 5 and 7.

The compounds of Formula 3 can be obtained by coupling the diazonium salt of 4-amino-4'-nitrostilbene-2,2'-disulphonic acid or of a naphthylamine-disulphonic acid with an amine of the formula:

where $R_3$ represents H or $CH_3$ and the benzene nucleus A may be substituted as in Formula 2.

As examples of naphthylamine disulphonic acids which may be used, there may be mentioned:

1-naphthylamine-2,7-, 3,6-, 3,8-, 4,6-, 4,7- and 6,8-disulphonic acids
and 2-naphthylamine-1,5-, 3,6-, 3,7-, 4,8-, 5,7- and 6,8-disulphonic acids.

As examples of amines of Formula 5 which may be used, there may be mentioned:

aniline,
N-methylaniline,
m-toluidine,
2,5-dimethylaniline,
cresidine,
N-methyl-m-toluidine, o-anisidine,
m-anisidine,
2,5-dimethoxyaniline,
m-aminophenylurea,
m-aminoacetanilide.

The compounds of Formula 4 can be obtained by coupling 1-amino-8-naphthol-3,6- or 4,6-disulphonic acid or
2-amino-5-naphthol-1,7-disulphonic acid with the diazonium salt of an aminophenol of the formula:

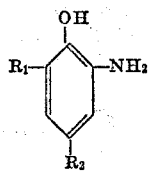

(6)

wherein $R_1$ and $R_2$ have the meanings stated above and treating the resultant monoazo compound with a copper salt. As examples of aminophenols of Formula 6 which may be used, there may be mentioned:

2-aminophenol-4-sulphonic acid or 4,6-disulphonic acid
6-nitro-2-aminophenol-4-sulphonic acid
4-nitro-2-aminophenol-6-sulphonic acid
6-chloro-2-aminophenol-4-sulphonic acid
4-chloro-2-aminophenol-6-sulphonic acid.

As examples of copper salts which may be used there may be mentioned copper sulphate, copper acetate or their amine derivatives from, e.g. ammonia, pyridine or ethanolamine.

The new dyestuffs can be isolated from the reaction mixture in which they are formed by the usual means, preferably by salting followed by filtration, but also, for example, by direct drying of the whole condensation mixture, for example, by spray drying. If desired diluents such as urea, sodium chloride and/or sucrose, can be added before drying.

The new disazo dyestuffs are valuable for coloring cellulose textile materials, for example, textile materials comprising natural or regenerated cotton. For coloring such textile materials, the new dyestuffs are preferably applied, either by a dyeing or printing process, to the cellulose textile materials in conjunction with a treatment with an acid-binding agent, for example sodium hydroxide, sodium carbonate or sodium bicarbonate, which may be applied to the cellulose textile material before, during or after the application of the dyestuffs. Alternatively when the coloration process involves the use of a heating step a substance can be used, for example, sodium trichloroacetate, which is changed into an acid-binding agent during the heating step. When so applied to cellulose textile materials especially from long liquor ratio dyebaths, the new disazo dyestuffs react with the cellulose and can be built up to give strong reddish brown to orange brown shades having very good fastness to light and to wet treatments especially to bleaching treatments.

Within the broad class defined above, those wherein X represents a group of Formula 2 have very good freedom from staining during washing tests, but those wherein Y represents the group of Formula 2 are capable of building up to deeper shades; within this latter class the dyes wherein $R_3$ is $CH_3$ give better freedom from staining during washing tests.

Accordingly a preferred class of the new dyestuffs are those represented by the formula:

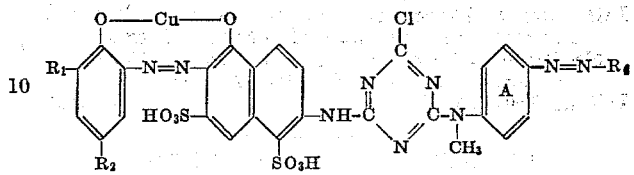

wherein the symbols $R_1$, $R_2$ and $R_4$ have the meanings stated above and the benzene ring A may be substituted by $CH_3$, $OCH_3$, $NHCOCH_3$ or $NHCONH_2$.

The invention is illustrated but not limited by the following examples in which parts and percentages are by weight:

EXAMPLE 1

A solution of 6.47 parts of the trisodium salt of the 1:1 copper complex of 6-amino-2-(2'-hydroxyphenylazo)-1-naphthol-3,5,5'-trisulphonic acid in 100 parts of water at pH 7 is added during ½ hour to a stirred suspension of 1.95 parts of cyanuric chloride in 20 parts of acetone, 20 parts of water and 20 parts of ice. pH 5–6 is maintained by the addition of an 8% aqueous solution of sodium hydroxide as required and the resulting solution is stirred at a temperature of 0–5° C. for a further 1 hour to complete the reaction. The solution is then screened.

The filtrate is stirred at a temperature of 20–25° C. and a solution of 5.62 parts of the disodium salt of 4-(4''-methylaminophenylazo)-4'-nitrostilbene-2,2'-disulphonic acid in 400 parts of water is added. The temperature is raised to 35–40° C. and pH 5–6 maintained for 1 hour by the addition of an 8% aqueous solution of sodium hydroxide. The reaction solution is stirred for a further 17 hours at 35–40° C., the pH readjusted to 6 and the dyestuff isolated by the addition of sodium chloride. The filter cake is redissolved in 300 parts of water and precipitated by the addition of 30 parts of sodium chloride. The product is filtered, washed with acetone and dried at 40° C.

The dyestuff so obtained contains 1.0 atom of hydrolyzable chlorine per molecule. When applied to cellulose textile materials, in conjunction with treatment with an acid-binding agent, the dyestuff gives orange-brown shades having very good fastness to washing, light and bleach.

The following table describes other examples of dyestuffs of the invention, being obtained in similar way to Example 1 by condensing cyanuric chloride with the copper complex of the aminoazo compound obtained from the diazo and coupling components of columns II and III with the aminoazo compound obtained from the diazo and coupling components of columns IV and V. The shade obtained from the dyestuff is stated in column VI.

| I | II | III | IV | V | VI |
|---|---|---|---|---|---|
| Example | Diazo component | Coupling component | Diazo component | Coupling component | Shade |
| 2 | 2-aminophenol-4-sulphonic acid. | 2-amino-5-naphthol-1,7-disulphonic acid. | 2-naphthylamine-4,8-disulphonic acid. | N-methylaniline | Reddish brown. |
| 3 | 6-chloro-2-aminophenol-4-sulphonic acid. | 1,8-aminonaphthol-3,6-disulphonic acid. | 4-amino-4'-nitrostilbene-2,2'-disulphonic acid. | do | Brown. |
| 4 | 2-aminophenol-4,6-disulphonic acid. | do | do | do | Do. |
| 5 | do | 2-amino-5-naphthol-1,7-disulphonic acid. | do | do | Orange-brown. |
| 6 | do | do | 2-naphthylamine-4,8-disulphonic acid. | m-Toluidine | Do. |
| 7 | do | 1,8-aminonaphthol-3,6-disulphonic acid. | do | do | Reddish brown. |
| 8 | 6-chloro-2-aminophenol-4-sulphonic acid. | do | do | do | Do. |
| 9 | 6-nitro-2-aminophenol-4-sulphonic acid. | 2-amino-5-naphthol-1,7-disulphonic acid. | do | do | Orange-brown. |
| 10 | 2-aminophenol-4-sulphonic acid. | do | do | m-Aminophenylurea | Do. |
| 11 | 6-nitro-2-aminophenol-4-sulphonic acid. | 1-amino-8-naphthol-3,6-disulphonic acid. | 2-naphthylamine-4,8-disulphonic acid. | do | Red-brown. |

TABLE—Continued

| Example | Diazo component | Coupling component | Diazo component | Coupling component | Shade |
|---|---|---|---|---|---|
| 12 | 2-aminophenol-4,6-disulphonic acid. | 1-amino-8-naphthol-3,6-disulphonic acid. | 2-naphthylamine-4,8-disulphonic acid. | m-Aminophenylurea | Red-brown. |
| 13 | 6-nitro-2-aminophenol-4-sulphonic acid. | 2-amino-5-naphthol-1,7-disulphonic acid. | 4-amino-4'-nitrostilbene-2,2'-disulphonic acid. | N-methylaniline | Orange-brown. |
| 14 | ...do... | 1-amino-8-naphthol-4,6-disulphonic acid. | ...do... | N-methyl-m-toluidine | Red-brown. |
| 15 | 6-chloro-2-aminophenol-4-sulphonic acid. | 2-amino-5-naphthol-1,7-disulphonic acid. | ...do... | N-methylaniline | Orange-brown. |
| 16 | 2-aminophenol-4,6-disulphonic acid. | ...do... | 2-naphthylamine-1,5-disulphonic acid. | 2,5-dimethoxyaniline | Do. |
| 17 | ...do... | ...do... | 1-naphthylamine-4,8-disulphonic acid. | m-Aminoacetanilide | Do. |
| 18 | ...do... | ...do... | 1-naphthylamine-3,6-disulphonic acid. | N-methylaniline | Do. |
| 19 | 2-aminophenol-4-sulphonic acid. | 1-amino-8-naphthol-3,6-disulphonic acid. | 2-naphthylamine-4,8-disulphonic acid. | m-Toluidine | Red-brown. |
| 20 | 2-aminophenol-4-sulphonic acid. | 1-amino-8-naphthol-4,6-disulphonic acid. | 2-naphthylamine-6,8-disulphonic acid. | m-Aminoacetanilide | Do. |
| 21 | 4-chloro-2-aminophenol-6-sulphonic acid. | 1-amino-8-naphthol-3,6-disulphonic acid. | 2-naphthylamine-5,7-disulphonic acid. | 2,5-dimethylaniline | Do. |
| 22 | ...do... | ...do... | 1-naphthylamine-4,6-disulphonic acid. | N-methyl-m-toluidine | Do. |
| 23 | 2-aminophenol-4,6-disulphonic acid. | 2-amino-5-naphthol-1,7-disulphonic acid. | 2-naphthylamine-3,7-disulphonic acid. | 2-methoxy-5-methylaniline | Orange-brown. |
| 24 | 6-nitro-2-aminophenol-4-sulphonic acid. | 1-amino-8-naphthol-4,6-disulphonic acid. | 1-naphthylamine-4,7-disulphonic acid. | N-methyl-m-toluidine | Red-brown. |
| 25 | 4-nitro-2-aminophenol-6-sulphonic acid. | ...do... | 2-naphthylamine-3,6-disulphonic acid. | m-Aminophenylurea | Do. |

We claim:
1. A disazo dyestuff of the formula

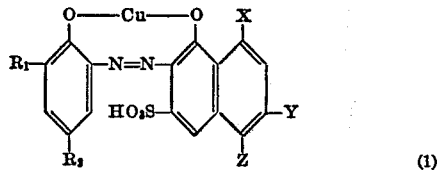

wherein $R_1$ is H, Cl, $NO_2$ or $SO_3H$ and $R_2$ is Cl, $NO_2$ or $SO_3H$, at least one of $R_1$ and $R_2$ being $SO_3H$, and *either* X is H, Z is $SO_3H$ and Y is

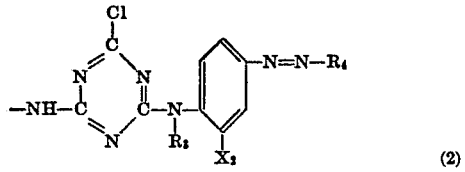

wherein $R_3$ is H or $CH_3$, $R_4$ is 4'-nitro-2,2'-disulphostilbene-4-yl or disulphonaphthyl, $X_1$ is H, $CH_3$ or $OCH_3$ and $X_2$ is H, $CH_3$, $OCH_3$, $NHCOCH_3$ or $NHCONH_2$, *or* X is formula (2), one of Y and Z is H and the other is $SO_3H$.

2. A dyestuff as claimed in claim 1 having the formula:

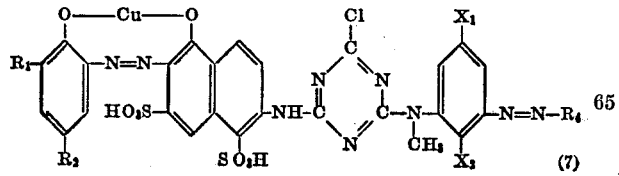

wherein $X_1$, $X_2$, $R_1$, $R_2$ and $R_4$ have the meanings stated in claim 1.

3. A disazo dyestuff as claimed in claim 2 wherein $R_2$ is $SO_3H$ and $R_2$ is H or $SO_3H$.

4. A disazo dyestuff as claimed in claim 3 wherein $R_4$ is 4' - nitro - 2,2'-disulphostilbene-4-yl, $R_3$ is $CH_3$ and $X_1$ and $X_2$ are each H.

5. A disazo dyestuff as claimed in claim 1 wherein $R_4$ is 4,8-disulphonaphth - 2 - yl, $R_3$ is H, $X_1$ is H and $X_2$ is selected from $CH_3$, $NHCOCH_3$ and $NHCONH_2$.

6. A dyestuff as claimed in claim 4 having the formula:

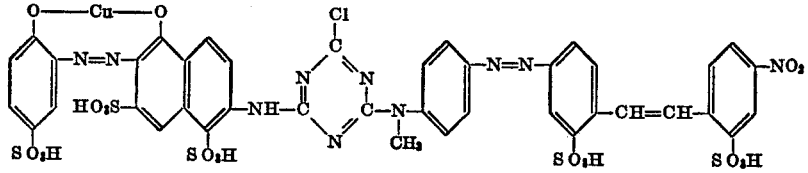

7. A dyestuff as claimed in claim 1 wherein $R_2$ is $SO_3H$ and $R_1$ is H or $SO_3H$.

8. A dyestuff as claimed in claim 7 wherein $R_4$ is 4'-nitro-2,2'disulphostilbene-4-yl, $R_3$ is $CH_3$ and $X_1$ and $X_2$ are each H.

9. A dyestuff as claimed in claim 1 wherein $R_4$ is 4'-nitro-2,2'-disulphostilbene-4-yl, $R_3$ is $CH_3$ and $X_1$ and $X_2$ are each H.

10. A dyestuff as claimed in claim 2 wherein $R_4$ is 4,8-disulphonaphth-2-yl, $R_3$ is H, $X_1$ is H and $X_2$ is selected from $CH_3$, $NHCOCH_3$ and $NHCONH_2$.

References Cited
UNITED STATES PATENTS 3,424,738   1/1969   Andrew _____ 260—146 T
3,349,074   10/1967  Andrew _____ 260—146 T FLOYD D. HIGEL, Primary Examiner U.S. Cl. X.R.

260—141, 151, 153, 205, 508, 509, 575

UNITED STATES PATENT OFFICE
CERTIFICATE OF CORRECTION

Patent No. 3,803,121   Dated April 9, 1974

Inventor(s) Peter Gregory

It is certified that error appears in the above-identified patent and that said Letters Patent are hereby corrected as shown below:

Column 1, line 24 should read --Z is $SO_3H$--.

Column 5, formula (2) should read --

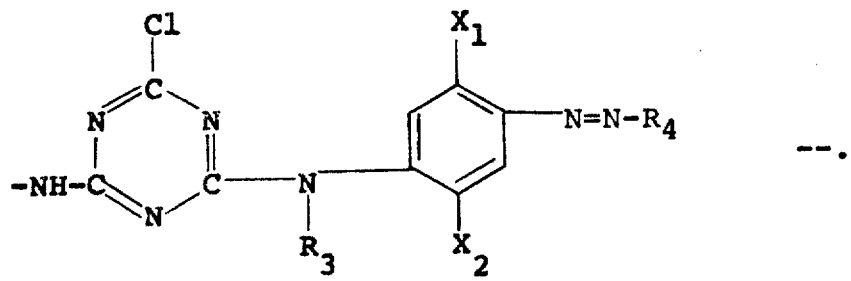

--.

Column 6, line 27, should read --and $R_1$ is H or $SO_3H$--.

Column 6, line 29, "$R_3$ is $CH_3$" should be deleted.

Column 6, line 55, "$R_3$ is H" should be deleted.

Signed and sealed this 1st day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,803,121　　　　　　　Dated April 9, 1974

Inventor(s) Peter Gregory

It is certified that error appears in the above-identified patent and that said Letters Patent are hereby corrected as shown below:

In the Heading:

Please add the following:

--Claims priority, application Great Britain, February 25, 1971, 5420--

Signed and sealed this 20th day of May 1975.

(SEAL)
Attest:

RUTH C. MASON
Attesting Officer

C. MARSHALL DANN
Commissioner of Patents
and Trademarks